United States Patent
Heuer

(10) Patent No.: US 6,842,455 B1
(45) Date of Patent: Jan. 11, 2005

(54) CONVERSION OF CONTIGUOUS CONCATENATION OF VIRTUAL CONCATENATION IN A SYNCHRONOUS DIGITAL COMMUNICATION NETWORK

(75) Inventor: Volkmar Heuer, Ditzingen (DE)

(73) Assignee: Alcatel, Paris (FR)

( * ) Notice: Subject to any disclaimer, the term of this patent is extended or adjusted under 35 U.S.C. 154(b) by 936 days.

(21) Appl. No.: 09/615,700

(22) Filed: Jul. 13, 2000

(30) Foreign Application Priority Data

Jul. 14, 1999 (DE) .......................... 199 32 739

(51) Int. Cl.[7] .............................................. H04L 12/28
(52) U.S. Cl. ................. 370/393; 370/395.51; 370/466; 370/907
(58) Field of Search ................................ 370/468, 355, 370/389, 395.51, 230, 235, 395.1, 395.6, 401, 420, 474, 464, 465, 505, 536, 905, 907

(56) References Cited

U.S. PATENT DOCUMENTS

| | | | | |
|---|---|---|---|---|
| 5,706,285 A | * | 1/1998 | Saijonmaa et al. | 370/230.1 |
| 5,764,645 A | * | 6/1998 | Bernet et al. | 370/395.52 |
| 6,014,708 A | * | 1/2000 | Klish | 709/232 |
| 6,584,118 B1 | * | 6/2003 | Russell et al. | 370/466 |
| 6,667,989 B1 | * | 12/2003 | Sekii et al. | 370/465 |

FOREIGN PATENT DOCUMENTS

| | | |
|---|---|---|
| EP | 091306 A2 | 3/1999 |
| GB | 2310871 | * 10/1997 |
| WO | WO 9733398 | 9/1997 |

OTHER PUBLICATIONS

Malis et al, PPP over Sonet/SDH, RFC 2615, pp. 1–10, Jun. 1999.*
ITU–T G.707, Chapter 8.1.7.
Product Overview, Article retrieved from Internet at URL "http://www.cisco.com/univercd/cc/td/doc/product/core/cis12008/mfricg/product1.htm".

* cited by examiner

Primary Examiner—Frank Duong
(74) Attorney, Agent, or Firm—Sughrue Mion, PLLC

(57) ABSTRACT

In a method of transmitting user data over a synchronous digital communication network (SDH), the user data are packed in multiplex units by a peripheral device (10; 40). If a greater bandwidth than the capacity of the multiplex unit is required, several multiplex units are contiguously concatenated (VC-4-4c) and transmitted in a common transport module (STM-4). At the gateway to the synchronous communication network, the contiguous concatenation of the multiplex units (VC-4-4c) is converted to a virtual concatenation of multiplex units (VC-4-Nv). To adapt the number of concatenated multiplex units to the bandwidth actually required, only part of the multiplex units are filled with user data, and during the conversion, those multiplex units which are not filled with user data are omitted.

6 Claims, 2 Drawing Sheets

CONVERSION OF CONTIGUOUS CONCATENATION OF VIRTUAL CONCATENATION IN A SYNCHRONOUS DIGITAL COMMUNICATION NETWORK

BACKGROUND OF THE INVENTION

This invention relates to a method of transmitting user data over a synchronous digital communication network to a multiplexer for a synchronous digital communication network and to a peripheral device transmitting user data over a synchronous digital communication network.

In a synchronous digital communication network such as in SDH or SONET systems, messages are transmitted as payloads of multiplex units. Such multiplex units are referred to in SDH systems as virtual containers and in SONET as virtual tributaries. The multiplex units are transmitted in synchronous transport modules STM-N (N=1, 4, 16, 64), in which they can be positioned freely. In SDH, the largest multiplex unit is the virtual container VC-4 with a payload capacity of 149.760 Mb. Together with a pointer in the overhead of the transport module STM-1, which points to the beginning of the container, the VC-4 is called an AU-4 (administrative unit). In SONET, the largest multiplex unit is a VT-3 with a capacity of 48.384 Mb, which, together with a corresponding pointer, is called an AU-3. If payload signals whose bit rate is greater than the payload of the largest multiplex unit are to be transmitted, a concatenation of multiplex units is formed.

ITU-T G. 707, Chapter 8.1.7, describes two methods of concatenation, which can be used alternatively: "contiguous concatenation", or "concatenation of contiguous AU-4s" (Chapter 8.1.7.1), and "virtual concatenation" (Chapter 8.1.7.2). In the contiguous concatenation method, successive multiplex units are concatenated which are transported together in a larger transport module, e.g., four AU-4s in a single STM-4, sixteen AU-4s in a single STM-16, three AU-3s in a single STM-1, or twelve AU-3s in a single STM-4. When the concatenated multiplex units are accessed, only the pointer to the first multiplex unit of the concatenation is evaluated, and this pointer value is also used for all subsequent multiplex units in the concatenation. In the virtual concatenation method, the individual multiplex units are transported independently of each other and are combined at the data sink, i.e., in the destination network element. The individual multiplex units may even be transmitted over different paths and exhibit differential delays at the data sink, which must be compensated for by buffering. Usually, only like multiplex units, i.e., multiplex units of the same size, are concatenated.

While in peripheral devices, e.g., in IP routers, which use a synchronous digital communication network as a backbone network, contiguous concatenation is preferred, because it is easier to handle, from a network point of view, virtual concatenation is preferred because of its greater flexibility. Conversion from contiguous concatenation to virtual concatenation is known per se. Each of the individual multiplex units is provided with its own pointer. An indicator in the overhead of the multiplex units indicates the concatenation. For the indicator, bits 1 and 2 of the H4 byte are currently used; the use of other overhead bytes is conceivable. The virtually concatenated multiplex units can then be transported in separate transport modules.

As mentioned, peripheral devices, such as IP routers, preferably use contiguous concatenation. In an article about the Cisco 12008 Gigabit Switch Router, retrievable from the Internet at URL "http://www.cisco.com/univercd/cc/td/doc/product/core/c isl2008/mfricg/product1.htm", it is described that the device can be equipped with an OC-3c/STM-1c interface or an OC-12c/STM-4c interface. Both interface types use contiguous concatenation of multiplex units. Since the number of contiguously concatenated multiplex units depends on the interface type of the router, always the same number of multiplex units are transmitted regardless of the bandwidth actually used for the IP payload.

SUMMARY OF THE INVENTION

It is an object of the invention to provide a method of transmitting user data over a synchronous digital communication network wherein the number of concatenated multiplex units can be adapted to the actually required bandwidth. Further objects of the invention are to provide a multiplexer for a synchronous digital communication network and a peripheral device which are suited for carrying out the method according to the invention.

These objects are attained by the features of claims 1, 5, and 6, respectively. Further developments of the invention are apparent from the dependent claims.

BRIEF DESCRIPTION OF THE DRAWINGS

The invention will become more apparent by reference to the following description of an embodiment taken in conjunction with the accompanying drawings, in which.

DETAILED DESCRIPTION OF THE INVENTION

A basic idea of the invention is to generate a contiguous concatenation of multiplex units in the peripheral device, but to use only part of the concatenated multiplex units for the payload and keep the remainder free or fill it with a fill pattern. Another basic idea of the invention consists in the fact that the multiplexer at the interface to a synchronous digital communication network performs a conversion from contiguous concatenation to virtual concatenation and in this process omits those multiplex units which are not filled with payload, thus adapting the number of concatenated multiplex units to the actually needed bandwidth.

In explaining the transmission method according to the invention, only one direction of transmission will be considered for the sake of clarity. It is to be understood, however, that the transmission can also be bidirectional.

Figure 1:
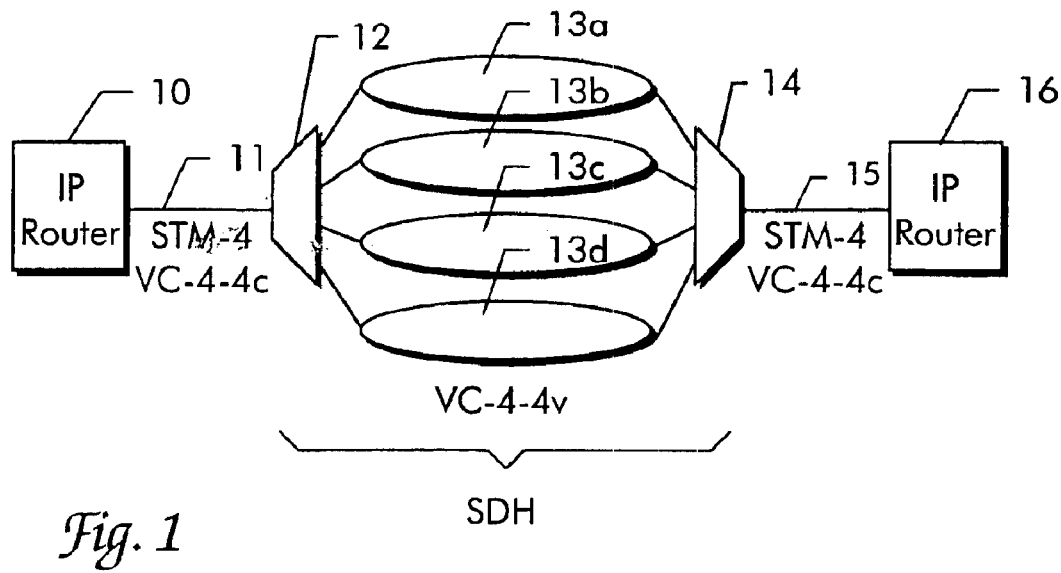
FIGS. 1 to 3 show an IP router which is connected to a synchronous digital communication network and generates a synchronous message signal with contiguously concatenated multiplex units, the contiguous concatenation being converted to virtual concatenation in a multiplexer of the communication network.

FIG. 1 illustrates how a payload is transmitted from a first peripheral device 10 over a synchronous digital communication network SDH to a second peripheral device 16. The peripheral devices are IP routers, and the payload consists of data packets that are structured according to the Internet protocol. In the first IP router 10, a synchronous message signal 11 is generated. It is a framed multiplex signal of the STM-4 type. The STM-4 frame consists of four-byte-interleaved STM-1 transport modules. Each of the four STM-1frames contains a multiplex unit VC-4. The four VC-4 multiplex units are contiguously concatenated. This gives a maximum payload of 4×149 Mb=596 Mb, which is filled by the IP router with the IP packets to be transmitted. To pack the IP packets in the multiplex units, use can be made of the Point-to-Point Protocol (PPP), for example, which was defined by the IETF (Internet Engineering Task Force). The concatenation method described is referred to as VC-4-4c. The IP routers 10, 16 form part of a data network and use the synchronous digital communication network SDH as a backbone network.

From the first IP router 10, synchronous message signal 11 is transferred to a multiplexer 12 of the synchronous signal communication network SDH. Multiplexer 12 provides the gateway from the synchronous communication network SDH1 to the data network. It converts the seamless concatenation of the four VC-4 multiplex units to a virtual concatenation. To accomplish this, as mentioned above, each of the four multiplex units is provided with its own pointer, and an indicator is inserted in the overhead of the multiplex units which indicates the concatenation. The four virtually concatenated VC-4 multiplex units can now be transmitted through the communication network SDH independently of each other in separate smaller or common larger transport modules. In the embodiment it is indicated that each of the four concatenated multiplex units is transmitted over a separate path 13a–d. The virtual concatenation is designated as VC-4-4v.

The virtually concatenated multiplex units are transmitted through the communication network SDH to the data sink, a second multiplexer 14. The latter converts the virtual concatenation back to a contiguous concatenation and transfers the four seamlessly concatenated multiplex units, in a message signal 15 organized into STM-4 frames, to the second IP router 16.

The multiplexers may be add/drop multiplexers or terminal multiplexers which terminate individual or all paths that are contained in the received, framed multiplex signals.

During periods of high traffic loads in the data network, all multiplex units are packed full of IP packets, and the above-described data transmission over the synchronous digital communication network acting as a backbone network is fast and efficient.

During packet transmission, however, there also are prolonged periods in which the number of IP packets to be transmitted does not suffice to pack all four multiplex units full. Then, according to the invention, only part of the multiplex units are used in IP router 10 for the transport of data packets, and the other multiplex units remain empty or are filled with a fill pattern.

Figure 2:
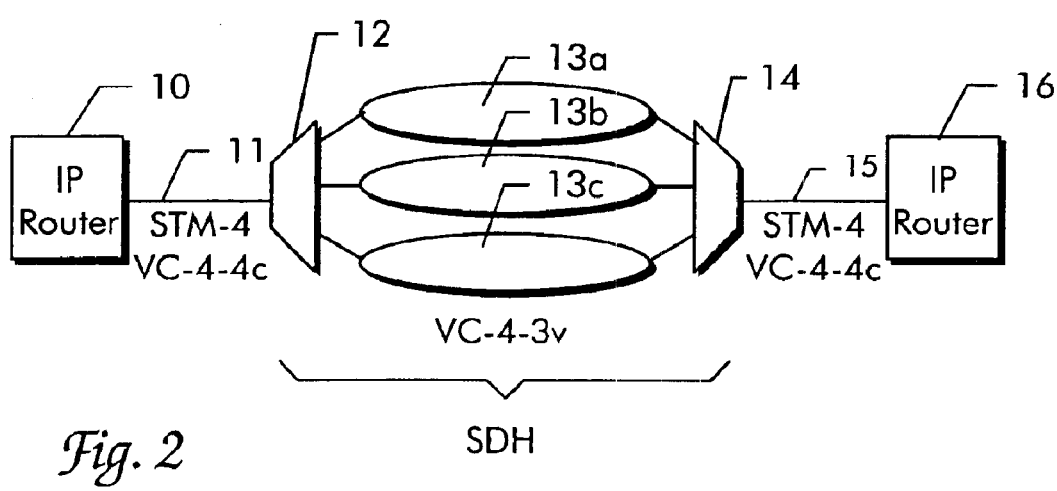

This situation is illustrated in FIG. 2. IP router 10 packs only three of the four concatenated multiplex units VC-4-4c. The fourth multiplex unit remains empty. Message signal 11, however, which is sent by IP router 10 to multiplexer 12, still has the same structure, namely an STM-4 frame with four contiguously concatenated multiplex units VC-4-4c. In multiplexer 12, the contiguous concatenation is converted to a virtual concatenation, with the fourth multiplex unit, i.e., the unit not packed with data packets, being omitted. A virtual concatenation of three multiplex units VC-4-3v is thus obtained, which is transmitted over the paths 13a–c to the second multiplexer 14. There, the virtual concatenation is converted back to a contiguous concatenation, which, complemented by an empty multiplex unit to form VC-4-4c, is transferred to the second IP router 16.

As the STM-4 frame consists of four byte-interleaved STM-1 frames, it is very simple for the IP router to leave one multiplex unit free: it simply inserts a dummy byte (e.g., hex00) after every three bytes. To convert the contiguous concatenation of four multiplex units to a virtual concatenation of three multiplex units, the multiplexer needs the information that one of the four multiplex units, and which of them, is to be omitted. In one embodiment, this information is provided by the IP router, either over a dedicated control channel in the overhead of the multiplex units or transport modules or via a higher-level network management system. In another embodiment, the multiplexer detects automatically, e.g. by the fill pattern or by missing IP headers, that one of the multiplex units is not packed with IP packets, and this empty multiplex unit is then omitted in the conversion. The automatic detection can be performed either by monitoring the payload in the multiplexer or by arranging for the IP router to label unused multiplex units in the overhead.

If a variant of the Point-to-Point Protocol (PPP, IETF) or a similar variant is used, IP packets will be framed in HDLC frames. Bytes between the HDLC frames are fill patterns.

Figure 3:
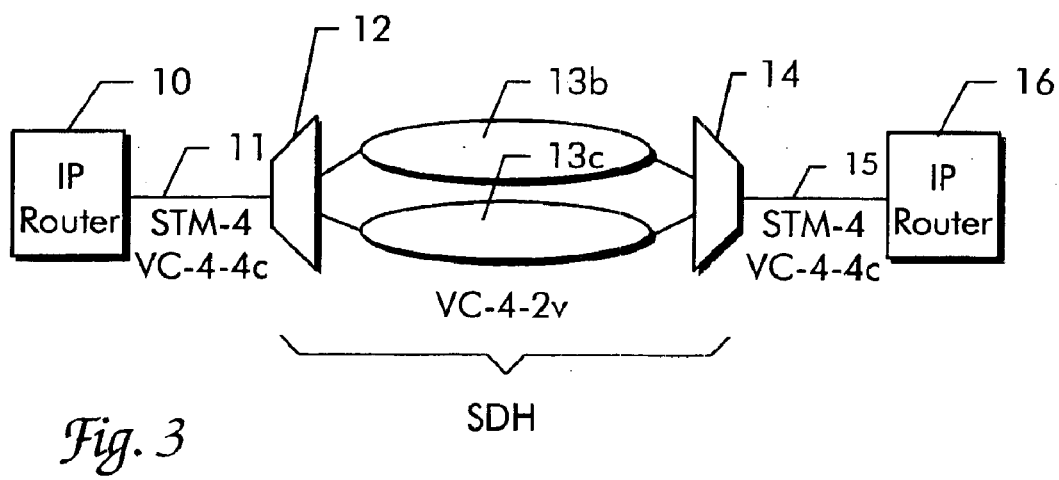

FIG. 3 shows that only two of the four multiplex units are used to transport IP packets and that the multiplexer, when converting to virtual concatenation, omits the two unused multiplex units and transmits only two of the originally four multiplex units over the communication network SDH. This concatenation is then denoted as VC-4-2v. Similarly, the contiguous concatenation can also be converted into a single multiplex unit by omitting three empty multiplex units.

The invention is not limited to a concatenation of virtual containers VC-4. It is also possible, for example, to use VC-12s with a payload of 2 Mb. The invention can also be used in SONET systems with containers VC-3 or VC-11 (VT-1.5). Larger concatenations of, e.g., 8, 16, or 64 containers are also possible.

The conversion into a smaller number of virtually concatenated multiplex units can also be predefined, so that at given times, for example, the full bandwidth of all multiplex units is available, while at other times, only a reduced capacity is available. For instance, a concatenation of three VC-4s can be chosen from 8:00 to 10:00 a.m. and from 4:00 to 6:00 p.m., a virtual concatenation of all four VC-4s during busy periods from 10:00 a.m. to 4:00 p.m., and a virtual concatenation of only one or two VC-4s during periods of light traffic from 6:00 p.m. to 8:00 a.m. In this way, the actually transmitted payload can be adapted to the statistical utilization of the data network. Alternatively, a dynamic adaptation according to a measured traffic volume can be performed approximately every 10 min. If a default value is used, the transfer from the IP router to the multiplexer of information as to which multiplex units are currently being used for data packets is not necessary.

This results in a considerable advantage to the operator of the data network, since he must pay fees only for the actually transmitted multiplex units to the operator of the synchronous communication network that he uses as a backbone.

Another preferred application of the method according to the invention is in the transmission of data packets that are structured according to the protocol for the asynchronous transfer mode (ATM). The peripheral device in that case is an ATM switch which packs the payload, consisting of ATM cells, in contiguously concatenated multiplex units and transfers the latter to the multiplexer of the synchronous communication network.

A further preferred application of the method according to the invention is in the transmission of data packets that are structured according to the Ethernet protocol. The Ethernet frames are framed in HDLC frames and are transported transparently in concatenated SDH containers. A fill pattern may be inserted between the HDLC frames, which is removed during the compression according to the invention in order to reduce the number of concatenated containers.

So far, only one direction of transmission has been considered. In the case of bidirectional transmission, however, a further advantageous field of application results. In the case of classic calls, the same transmission rate is necessary in both directions ("upstream" and "downstream"). During data transmission, however, things are different. For instance, in future data networks, such as in ADSL (Asymmetrical Digital Subscriber Line), traffic is expected to be highly asymmetrical. The compression according to the invention can therefore be used to advantage in only one direction of transmission, while in the other direction, the full capacity of all concatenated multiplex units is available. Here, the compression according to the invention is particularly advantageous since, as a rule, the physical interfaces of the peripheral devices offer the same bandwidth in both directions. Thus, the transmission capacity can be adapted to an asymmetrical traffic volume even if such symmetrical interfaces are present.

Figure 4:
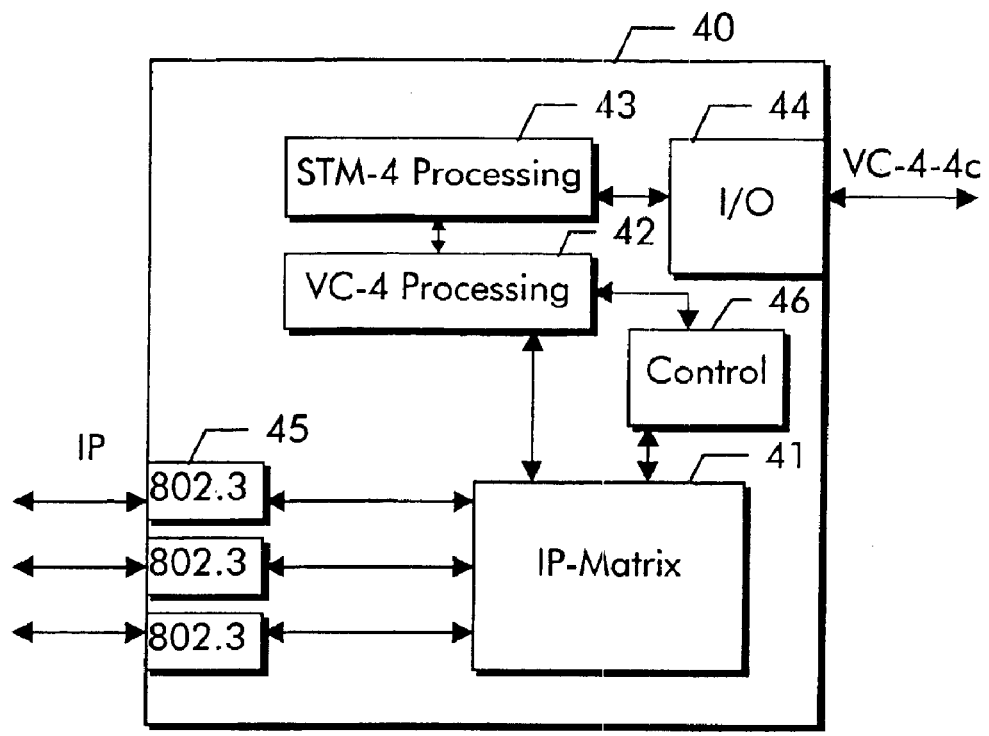
FIG. 4 is a block diagram of an IP router as a peripheral device for a synchronous communication network.

The IP router 40 of the embodiment is shown in FIG. 4 in a schematic block diagram. It has several LAN interfaces 45 (LAN=local area network), which use an asynchronous transmission method with collision detection according to IEEE Standard 802.3 for Ethernet. Connected to each of the LAN interfaces is a local area network, and IP router 40 receives data packets IP that are structured according to the Internet protocol. The packets are routed from the LAN interfaces to an IP matrix 41. The latter decides on the basis of the destination address of each packet where the packet is to be sent. Packets that are destined for another local area network connected to the IP router are sent to the corresponding LAN interface. The other packets, i.e., the packets that are not intended for any of the local area networks connected to the LAN interfaces, are switched through IP matrix 41 to a processing unit 42. There, four VC-4 multiplex units are formed and packed with the packets. The packed multiplex units are routed to a processing unit 43 for STM-4 transport modules, where the four multiplex units are contiguously concatenated and byte-interleaved to form a framed multiplex signal STM-4, VC-4-4c, which is then sent as a synchronous message signal to an interface I/O 44. In the STM-4 processing unit, a pointer that points to the beginning of the first multiplex unit is determined and written in the overhead of the transport modules. Interface 44 is an optical interface.

IP router 40 further includes a controller 46, which is connected to IP matrix 41 and to processing unit 42 for VC-4 multiplex units. IP matrix 41 measures a current traffic volume and passes the measured value to controller 46. The latter then decides at regular intervals based on the traffic volume or on a predetermined time schedule how many of the four multiplex units are to be packed with data packets, and communicates this to VC-4 processing unit 42. Accordingly, only the selected multiplex units are packed in processing unit 42, and the others are filled with a fill pattern. In processing unit 42, multiplex units that are not packed are labeled in the overhead. For this, one of the overhead bytes reserved for proprietary purposes can be used.

The IP router may also be configured so that only two or three of the four contiguously concatenated multiplex units are filled with user data. In that case, a controller 46 is not necessary. Processing unit 42 is then adjusted so that only the predetermined multiplex units are packed with IP packets and the others remain empty.

From the example it is apparent that IP matrix 41 performs a filter function, since only those IP packets are routed from the matrix to the VC-4 processing unit which are to be transported over the synchronous digital communication network to other local area networks that are not connected directly to a LAN interface of the IP router. IP matrix 41 may also perform a further filter function by eliminating packets that cannot be delivered over the synchronous digital communication network, or by returning such packets to the sender along with a corresponding error message. Such a filter function can also be performed through corresponding entries in the routing table of the IP matrix. This makes it possible to filter out nonexisting IP addresses or IP addresses that are erroneous due to a configuration error. In addition, a protection function similar to a firewall can be implemented in this way.

Figure 5:
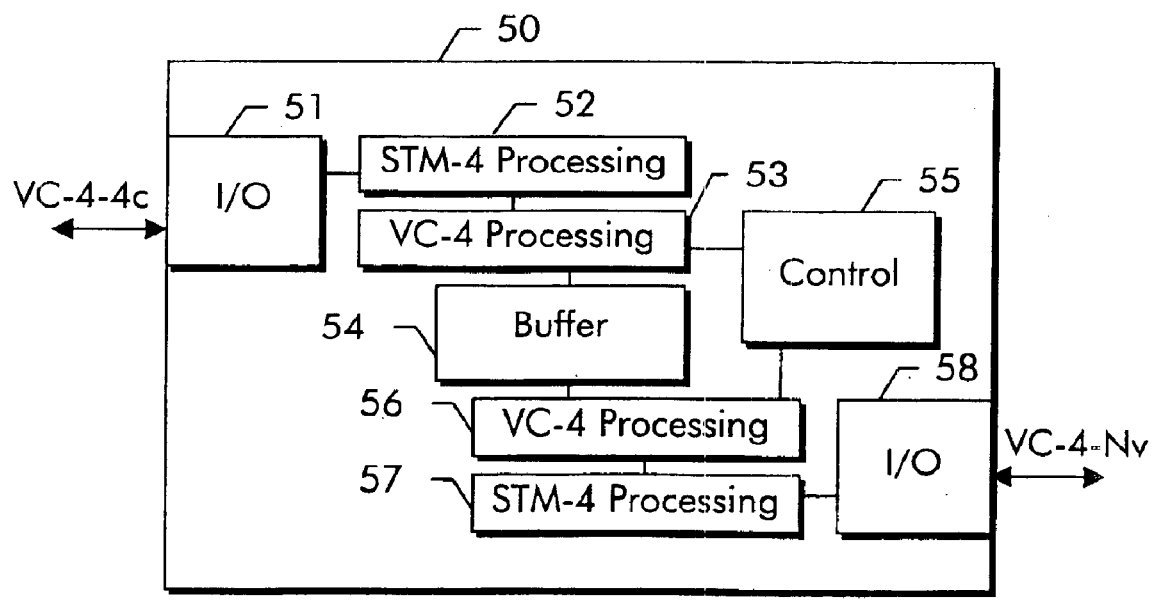
FIG. 5 is a block diagram of a multiplexer that performs the conversion.

The multiplexer 50 which receives the synchronous message signal, converts the contiguous concatenation to a virtual concatenation, and transmits the multiplex units over the synchronous communication system, is shown schematically in FIG. 5. At a first interface I/O 51, it receives the synchronous message signal from the peripheral device. In a first processing unit 52 for, STM-4 transport modules, the byte interleaving is resolved and the pointer to the first multiplex unit is evaluated. According to the pointer value, the four concatenated multiplex units are read and transferred to a first processing unit 53 for VC-4 multiplex units, where the overhead of the individual multiplex units is evaluated. An indicator which indicates that the respective multiplex unit is not filled with user data is detected, and the respective multiplex unit is eliminated. The information about this is also transferred to a controller 55. The other multiplex units are stored in a buffer 54, from which they are read by a second processing unit 56 for VC-4 multiplex units. The controller informs the second VC-4 processing unit 56 which and how many multiplex units are to be virtually concatenated. The virtual concatenation is initiated by a corresponding indicator in the overhead of the multiplex units. For this, the H4 byte is currently used.

The concatenated multiplex units are then transferred to a second processing unit 57 for STM-4 transport modules, where they are packed in separate STM-1 frames. The STM-1 frames are byte-interleaved to form a synchronous message signal consisting of STM-4 transport modules, which is then sent via a second interface I/O 58 into the synchronous digital communication network. The second STM-4 processing unit 56 also determines a pointer for each of the multiplex units, which points to the beginning of the respective multiplex unit and is entered in the overhead of the respective STM-1 transport modules.

In the embodiment, the input signal of the multiplexer contains a contiguous concatenation VC-4-4c of four VC-4 multiplex units. However, one of the four multiplex units is not used for the transport of user data, for example, and is identified as such in the overhead. In the first VC-4 processing unit, this multiplex unit is eliminated. Via the controller, the information that the other three multiplex units are to be virtually concatenated is passed to the second VC-4 processing unit, which performs the concatenation. An output signal is thus formed which contains a virtual concatenation VC-4-3v of three VC-4 multiplex units. The remaining transmission capacity can be used for additional traffic, e.g., for a bundle of telephone connections. Advantageously, the multiplexer informs the network management system how many multiplex units the virtual concatenation comprises, so that the free transmission capacity can be assigned for other purposes via the network management system.

Instead of identifying unused multiplex units of the contiguous concatenation in the overhead, the information as to which of the concatenated multiplex units are used for the transport of user data can also be transferred from the peripheral device to the multiplexer via the network management system. Alternatively, an evaluation of the payload contained in each multiplex unit takes place in the multiplexer to determine which of the multiplex units are packed with user data and which are unused.

The multiplexer may be a terminal multiplexer, an add/drop multiplexer, or a digital crossconnect. It may also include further modules, such as a time- and space-division switching matrix for multiplex units and further interfaces to the communication network. In that case, the individual multiplex units of the virtual concatenation can be transmitted to the destination network element via different interfaces and different paths. Instead of VC-4 multiplex units, other, smaller subunits from the multiplex hierarchy of the communication system can be used, such as VC-12s or VC-3s.

An alternative form of the peripheral device is an ATM switch. Such a switch is similar in design to the IP router of FIG. 4 but has ATM interfaces in place of the LAN interfaces and a switching matrix for ATM cells in place of the IP matrix.

What is claimed is:

1. A method of transmitting user data over a synchronous digital communication network (SDH), comprising:
   structuring the user data into user data units;
   packing the user data units in multiplex units;
   contiguously concatenating a plurality of multiplex units (VC-4-4c);
   transmitting the contiguously concatenated multiplex units in a common transport module (STM-4); and
   converting the contiguous concatenation of the multiplex units (VC-4-4c) to a virtual concatenation of multiplex units (VC-4-Nv),
   wherein only part of the multiplex units are filled with user data units, and wherein in the conversion, those multiplex units which are not filled with user data units are omitted.

2. A method as claimed in claim 1 wherein the user data units are data packets structured according to the Internet Protocol, wherein the packing of the data packets in multiplex units is performed in an IP router (10; 40), wherein the conversion of the contiguous concatenation (VC-4-4c) to the virtual concatenation (VC-4-Nv) is performed in a multiplexer (12; 50) of the synchronous digital communication network (SDH), and wherein the IP router (10; 40) informs the multiplexer (12; 50) which of the concatenated multiplex units are filled with data packets.

3. A method as claimed in claim 1 wherein the user data units are data packets structured according to the protocol for the asynchronous transfer mode (ATM), wherein the packing of the data packets in the multiplex units is performed in an ATM switch, wherein the conversion of the contiguous concatenation to the virtual concatenation is performed in a multiplexer (12; 50) of the synchronous digital communication network (SDH), and wherein the ATM switch informs the multiplexer (12; 50) which of the concatenated multiplex units are filled with data packets.

4. A method as claimed in claim 1 wherein the virtual concatenation is subsequently converted back to a contiguous concatenation, adding empty multiplex units corresponding to the previously omitted multiplex units.

5. A multiplexer (12; 50) for a synchronous digital communication network (SDH), comprising:
   a first interface (51) for receiving a first message signal which is organized into transport modules and contains a plurality of contiguously concatenated multiplex units carrying user data to be transmitted;
   a conversion facility (53, 54, 55, 56) for converting the contiguous concatenation to a virtual concatenation of the multiplex units; and
   at least a second interface (58) for sending at least a second message signal which is organized into transport modules and contains the virtually concatenated multiplex units,
   characterized in that the user data consists of user data units, and that if only part of the contiguously concatenated multiplex units are filled with the user data units, the conversion facility (53, 54, 55, 56), when converting the contiguous concatenation to the virtual concatenation, omits those multiplex units which are not filled with user data units.

6. A peripheral device (10, 40) for transmitting user data over a synchronous digital communication network, the peripheral device (10; 40) comprising:
   a signal-generating unit (43) for generating a message signal which is organized into transport modules and contains a plurality of contiguously concatenated multiplex units carrying user data, consisting of the user data units, to be transmitted; and
   a multiplexing facility (42, 46) for packing the user data units in the multiplex units,
   characterized in that the multiplexing facility (42, 46) fills only part of the multiplex units with user data units.

* * * * *